Feb. 17, 1942.    T. C. BEATTY    2,273,616
PIG FEEDER
Filed June 30, 1939    2 Sheets-Sheet 1

Inventor:
Thaddeous C. Beatty
By Tefft + Tefft
Attys.

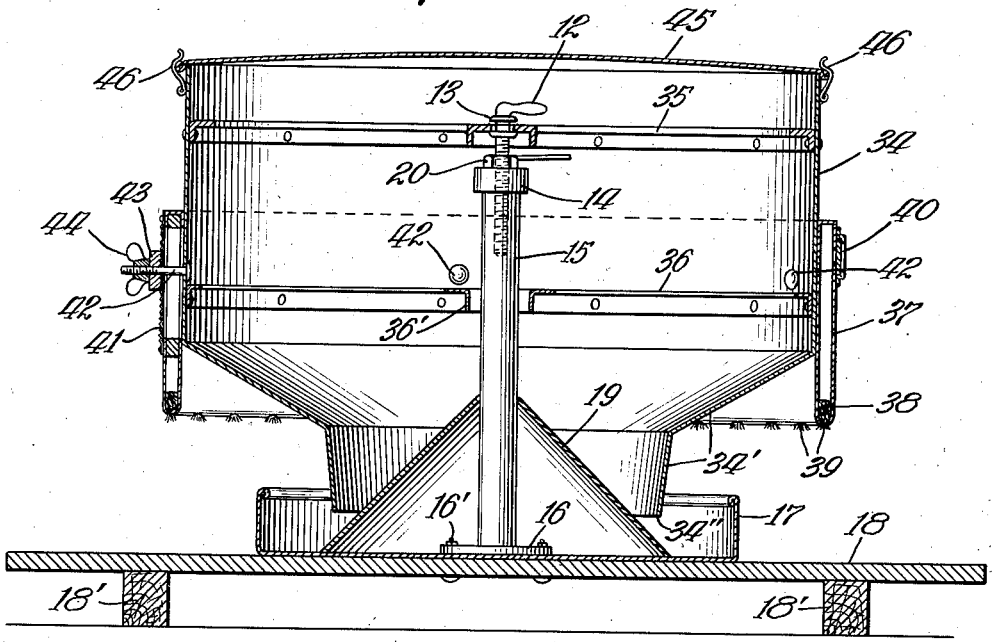

UNITED STATES PATENT OFFICE 2,273,616

PIG FEEDER

Thaddeous C. Beatty, Lynnville, Iowa

Application June 30, 1939, Serial No. 282,141

2 Claims. (Cl. 119—53.5)

This invention relates to a device for feeding and oiling pigs and hogs. A modern development in animal husbandry has been the feeding of ground feed, shelled corn and concentrates as opposed to the older method of feeding ear corn or other raw feeds. The best system of feeding pigs provides a progressively changing diet as the pigs grow or mature and prepares the pigs for earlier marketing. Generally this new system of feeding has proven more effective and profitable.

The principal object of this invention is to provide a feeding device wherein prepared feeds can be served pigs in a sanitary manner.

Another object is to provide a simple, economical feeder that may be adjusted to fit and serve pigs as they grow and which will prohibit larger pigs or hogs from obtaining the feed.

A still further object is to provide a feeder that will effectively apply oil or the like on the pigs as they feed, to act as an insecticide and hide treatment.

Other objects and benefits will be disclosed in the following descriptions and drawings in which:

Fig. 3 is an enlarged broken sectional view of the side of the feeder as it would appear on the section lines 3—3 of Fig. 2, to better show details of construction which will later be explained; and Fig. 4 is a cross sectional elevation view of an optional feeder structure which will later be explained.

Figure 1:
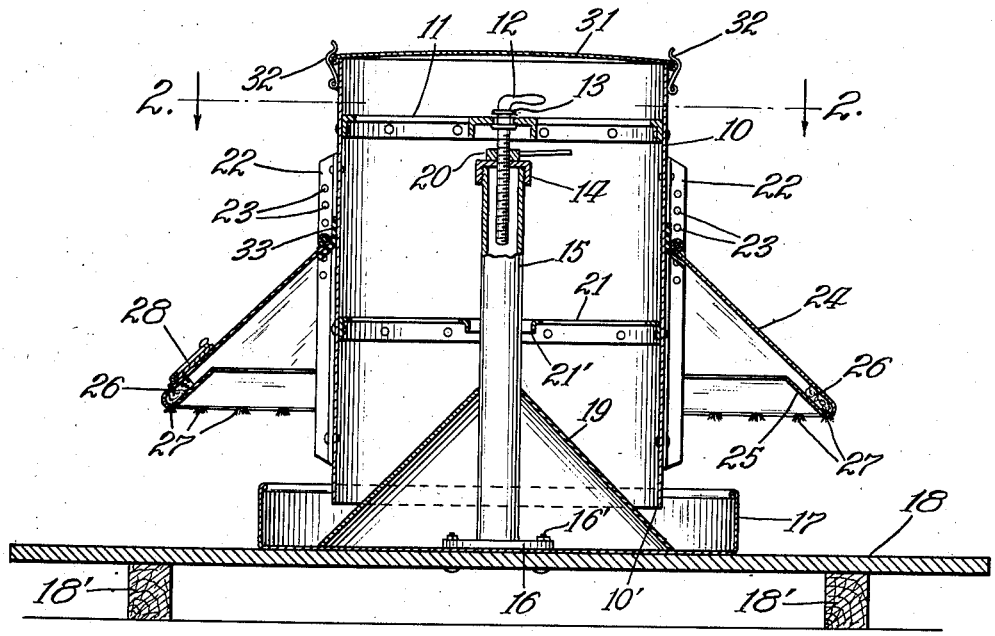
Fig. 1 is a cross-sectional elevation view of the feeder and oiler showing the relation and arrangement of the parts.

Now referring to the drawings and at the outset particularly to Fig. 1, I show a cylindrical barrel-like bin 10 loosely and rotatably mounted on a central support post 15 by means of a support member 11 supported by handle screw member 12 having retaining flanges 13. The handle screw member 12 is arranged to adjust the bin vertically, being threaded in the cap member 14 and then held in fixed position by the handle lock nut 20. The support post 15 is bolted by means of bolts 16' through the flange 16 into a wood platform 18 supported on cross skids 18'.

It will be noted that the support post 15 is attached through a feed pan 17 having vertical side walls of sufficient height to prevent field mice and the like from eating the feed. Surrounding the support post 15 is a conical support member 19 which directs the grain downward into the pan between the bottom edge of the bin 10' and the surface of the conical support 19. The bin is provided with a support 21 having a circular flange member 21' somewhat larger in inside diameter than the support post 15. It will be appreciated that the bin being rotatably mounted, can also rock within the limits of the flange 21' and thus grain or feed within the bin is agitated and fed downward into the pan 17' and controlled by the opening between the conical support member 19 and the lower edge of the bin 10'. The amount of feed can be nicely controlled by the vertical adjustment of the bin 10 as provided by the handle screw 12 which is afterwards fixed in position by the handle lock nut 20.

Affixed to the side of the bin 10 are T-bars 22 having adjustment holes 23 as shown. Surrounding the bin 10 is an octagonal hood 24 having an inturned flange section 25 in which is inserted an absorbent wicking material 26 which extends through holes 27 formed in the lower edge of the U-shaped chamber as formed by the inturned flange 25. This U-shaped chamber is designed to hold disinfectant and hide treating liquids such as oil and carbolic acid dips which are effective for hide treatments of pigs and hogs. It has been found that the ordinary crank case oil from automobiles and tractors is effective for treatment of this kind, and the device provides a use for this liquid which otherwise would be wasted. The liquid is applied to the wicking through openings in the hood 24 suitably covered by a cover member 28 as shown. The hood 24 is supported by means of brackets 29 by means of pins or bolts 30 inserted through the holes 23 in the T-bars 22. When pigs are small the hood is adjusted downward so that the feeding pigs contact the lower edge of the hood 24 while feeding and by this contact they may rotate or rock the bin 10, thus providing means to feed the grain into the pan 17 as well as applying the disinfectant liquid from the wick 26 through the holes 27. When the pigs become larger the hood 24 is adjusted upward to properly fit the hood to the size of the pigs. The arrangement of the hood 24 and the pan 17 is such that larger pigs and hogs cannot feed from the pan 17 and, therefore, the diet can be arranged to specifically fit the pigs in their various stages of development.

The bin 10 is provided with a cover 31 tightly fixed in position on top of the bin 10 by means of the spring clamps 32 or other similar fastening devices. Between the hood 24 and the bin 10 is a flexible closure member 33 made of rubber fabric or the like. This member effectively closes the opening between the hood 24 and the bin 10 so that feed is protected and kept dry in the tight feed pan 17. When feeding ground feeds, concentrates and the like it is important that these feeds be kept dry and it will be apparent from the above structure as explained that I have provided means whereby the bin may be adjusted to feed the various feeding materials in a proper supply and that this feed is continuously kept in a dry, sanitary condition. The arrangement of the hood 24 in relation to the bin 10 is well illustrated and will be completely understood by reference to the enlarged sectional drawing shown in Fig. 3.

Figure 2:
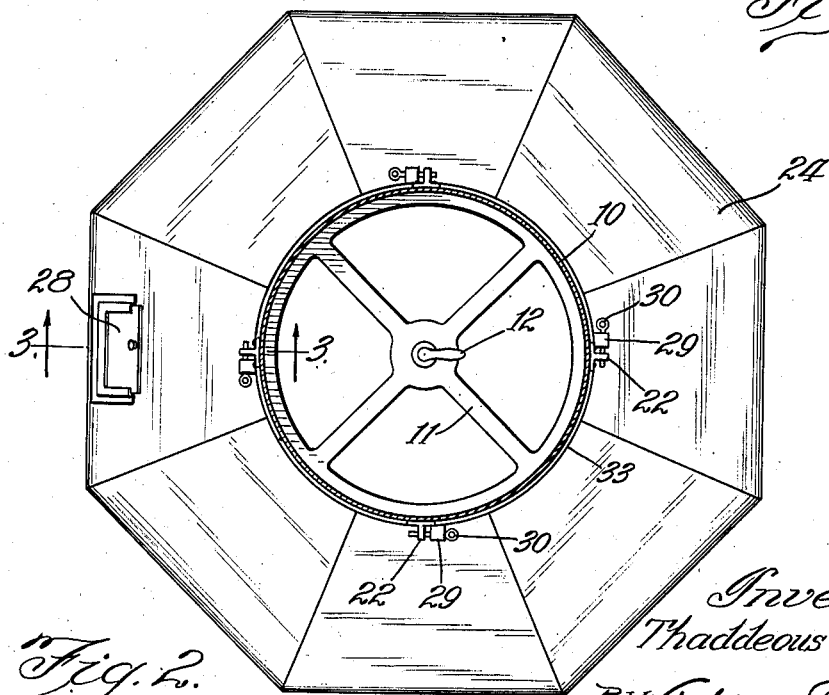
Fig. 2 is a top cross sectional plan view of the feeder as shown in Fig. 1, as it appears on the section lines 2—2 of Fig. 1.

Although I have shown a preferred embodiment of my invention in Figs. 1, 2, and 3, it is appreciated that the same benefits may be obtained by various structures. Illustrative of this fact I show in Fig. 4 an optional structure of my pig feeder. The center support 15, feed pan 17, conical member 19, together with the adjustment screw 12 and relating members are the same as heretofore described for Fig. 1. However, the bin member 10, as shown in Fig. 1, has been increased in diameter to form a larger bin 34 which has a frusto-conical shaped bottom 34' ending in a bottom edge 34" to assume the same relationship of the bottom edge 10' with the conical member 19. The bin 34, being rotatably and rockably mounted, may be adjusted to feed the various types of grain and concentrates in the same manner as described for the structure in Fig. 1, it being supported in a similar manner by the support member 35 and the central member 36 having a flange opening 36' larger than the support 15.

Surrounding the bin 34 is a U-shaped shield member 37 having an absorbent wicking 38 exposed through holes 39 in its bottom edge. Oil and other disinfectant liquids are fed through the wicking 38 through a feed opening 40 as shown. This U-shaped shield is supported by through bolts 42 in the bin 34, the bolts extending through a slot in a toothed casting member 41 riveted into the U-shield 37. Engaged with the teeth in the member 41 is a toothed washer 43 which fixes the shield as desired in any adjusted relationship to the bin 34 by means of the thumb nuts 44 as shown. It will be appreciated that by loosening the thumb nuts 44 the shield may be raised or lowered in relation to the pan 17, thereby providing adjustment for various sized pigs as heretofore explained.

The bin 34 is tightly closed by means of a lid 45 held in position by spring clamps 46. It will be appreciated that because the bin is larger in diameter than the pan 17 and is surrounded tightly by the shield 37, that the feed in the feed pan 17 is effectively protected from rain and weather and thus the feed is always kept in a dry and sanitary condition.

Other variations, of course, are possible, but I do not wish to be constrained to any particular structure except as imposed by the following claims.

I claim:

1. In a pig feeding device, a feed pan, a feed supply bin, support means in said pan carrying said bin, said support means having mounted on its top a hand screw feed flow regulating member permitting said bin to be rotated, rocked, and adjusted vertically with respect to said pan, means mounted on the bin to limit the rock of the bin with respect to the support, and adjustable hood means carried by said bin and covering said pan whereby feed may be selectively served to pigs to the exclusion of larger pigs and hogs.

2. In a pig feeding device, a feed pan, a feed supply bin, support means in said pan carrying said bin, said support means having mounted on its top a hand screw feed flow regulating member permitting said bin to be rotated, rocked, and adjusted vertically with respect to said pan, means mounted on the bin to limit the rock of the bin with respect to the support, and adjustable shield means carried by said bin and shielding said pan whereby feed may be selectively served to pigs to the exclusion of larger pigs and hogs.

THADDEOUS C. BEATTY.